US012626397B2

(12) United States Patent
Peng et al.

(10) Patent No.: US 12,626,397 B2
(45) Date of Patent: May 12, 2026

(54) SIMULTANEOUS LOCALIZATION AND MAPPING (SLAM) METHOD PERFORMED BY ELECTRONIC DEVICES, ELECTRONIC DEVICES, AND STORAGE MEDIA

(71) Applicant: SAMSUNG ELECTRONICS CO., LTD., Suwon-si (KR)

(72) Inventors: Xiongfeng Peng, Beijing (CN); Zhihua Liu, Beijing (CN); Qiang Wang, Beijing (CN); Yuntae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 589 days.

(21) Appl. No.: 18/106,184

(22) Filed: Feb. 6, 2023

(65) Prior Publication Data

US 2023/0281867 A1     Sep. 7, 2023

(30) Foreign Application Priority Data

Feb. 25, 2022     (CN) .......................... 202210178991.7
Jun. 14, 2022     (KR) ........................ 10-2022-0072356

(51) Int. Cl.
| | |
|---|---|
| *G06T 7/73* | (2017.01) |
| *G06F 16/538* | (2019.01) |
| *G06F 16/55* | (2019.01) |
| *G06F 16/583* | (2019.01) |
| *G06T 7/60* | (2017.01) |

(52) U.S. Cl.
CPC .............. *G06T 7/74* (2017.01); *G06F 16/538* (2019.01); *G06F 16/55* (2019.01); *G06F 16/5854* (2019.01); *G06T 7/60* (2013.01)

(58) Field of Classification Search
None
See application file for complete search history.

(56) References Cited

U.S. PATENT DOCUMENTS

2011/0299770 A1* 12/2011 Vaddadi .............. G06V 10/757
                                                                  382/165
2021/0150755 A1     5/2021 Gao et al.

FOREIGN PATENT DOCUMENTS

| | | |
|---|---|---|
| CN | 109509230 A | 3/2019 |
| CN | 111080659 A | 4/2020 |
| CN | 112419497 A | 2/2021 |
| KR | 10-2021-0058686 A | 5/2021 |

OTHER PUBLICATIONS

Peng et al., "Accurate Visual-Inertial SLAM by Feature Re-identification", IROS2021, arXiv:2102.13438v1 [cs.CV], Feb. 26, 2021 (7 pages total).
Campos et al., "ORB-SLAM3: An Accurate Open-Source Library for Visual, Visual-Inertial, and Multimap Slam", IEEE Transactions on Robotics, 2021, pp. 1-17 (17 pages total).
Qin et al., "VINS-Mono: A Robust and Versatile Monocular Visual-Inertial State Estimator", IEEE Transactions on Robotics, 2018, vol. 34, No. 4, pp. 1004-1020 (17 pages total).

* cited by examiner

*Primary Examiner* — Lennin R Rodriguezgonzalez
(74) *Attorney, Agent, or Firm* — Sughrue Mion, PLLC

(57) ABSTRACT

A method performed by an electronic device includes: acquiring a search image based on a query image; acquiring first spatial features of the query image and second spatial features of the search image; and estimating a relative pose between the query image and the search image based on the first spatial features and the second spatial features.

19 Claims, 9 Drawing Sheets

ACQUIRE SEARCH IMAGE FOR QUERY IMAGE ──S101

ACQUIRE SPATIAL FEATURES OF QUERY IMAGE
AND SEARCH IMAGE ──S102

ESTIMATE RELATIVE POSE BETWEEN
QUERY IMAGE AND SEARCH IMAGE
BASED ON SPATIAL FEATURES ──S103

3D POINT SET
CLUSTERING

ORB DESCRIPTORS

CLUSTERING
DESCRIPTORS

CLUSTERING OF 3D POINT SETS
CORRESPONDING TO QUERY IMAGE

CLUSTERING OF 3D POINT SETS
CORRESPONDING TO SEARCH IMAGE

COARSE MATCHING

FINE MATCHING

3D POINT SETS
CORRESPONDING
TO QUERY IMAGE

ΔT

3D POINT SETS
CORRESPONDING
TO SEARCH IMAGE

POSE GUIDE MATCHING

FIG. 7

SIMULTANEOUS LOCALIZATION AND MAPPING (SLAM) METHOD PERFORMED BY ELECTRONIC DEVICES, ELECTRONIC DEVICES, AND STORAGE MEDIA

CROSS-REFERENCE TO RELATED APPLICATIONS

This application is based on and claims priority under 35 U.S.C. § 119 to Chinese Patent Application No. 202210178991.7 filed on Feb. 25, 2022, in the China National Intellectual Property Administration, and Korean Patent Application No. 10-2022-0072356, filed on Jun. 14, 2022, in the Korean Intellectual Property Office, the disclosures of which are incorporated by reference herein in their entireties.

BACKGROUND

1. Field

The present disclosure relates to simultaneous localization and mapping (SLAM), and more particularly, to methods performed by electronic devices, electronic devices, and computer-readable storage media.

2. Description of the Related Art

Simultaneous localization and mapping (SLAM) refers to a technique for creating/describing a real-time three dimensional (3D) map of a space in which a device is located and detecting the pose (location and attitude) of the device by using a camera and a sensor, such as a laser radar of the device. Due to camera calibration errors and limited feature matching accuracy, unavoidable cumulative errors occur during visual SLAM. To address this, a SLAM system may additionally include a loop closing (LC) module. The LC module reduces cumulative errors by identifying a common view relationship between the current frame and a prior frame and optimizing a global map, thereby realizing drift-free simultaneous localization.

In general, current SLAM techniques use a method of establishing visual constraints through feature matching or the like, and then calculating the relative pose between a query image and a search image to optimize a global map. However, this method causes relatively large visual variations and requires a relatively long period of time for optimizing a global map. Thus, it is needed to optimize current LC modules of SLAM systems.

SUMMARY

Provided are methods performed by electronic devices, electronic devices, and computer-readable storage media.

Additional aspects will be set forth in part in the description which follows and, in part, will be apparent from the description, or may be learned by practice of the presented embodiments of the disclosure.

The present disclosure provides methods performed by electronic devices, electronic devices, computer-readable storage media, and technical solutions therefor as follows.

A method performed by an electronic device includes: acquiring a search image based on a query image; acquiring first spatial features of the query image and second spatial features of the search image; and estimating a relative pose between the query image and the search image based on the first spatial features and the second spatial features.

The first spatial features and the second spatial features each include three dimensional (3D) point sets. The acquiring the first spatial features and the second spatial features each includes: extracting image feature points that include image keypoints and feature descriptors; and estimating the 3D point sets by performing stereo matching on the image feature points.

The estimating the relative pose includes acquiring feature matching results by matching at least one of the first spatial features with at least one of the second spatial features; and determining the relative pose based on the feature matching results.

The feature matching results comprise first feature matching pairs. The acquiring the feature matching results comprises generating the first feature matching pairs between results of clustering of the query image and results of clustering of the search image by clustering the 3D point sets of the query image and the 3D point sets of the search image.

The generating of the first feature matching pairs includes: determining one or more first cubes by clustering the 3D point sets of the query image; determining one or more second cubes by clustering the 3D point sets of the search image; determining first cluster centroids of the respective first cubes and second cluster centroids of the respective second cubes; determining the second cluster centroids that respectively match the first cluster centroids; and determining the first feature matching pairs based on the first cluster centroids and the second cluster centroids determined to match each other.

The feature matching results further include second feature matching pairs. The acquiring the feature matching results further comprises acquiring second feature matching pairs between the 3D point sets of the query image and the 3D point sets of the search image by performing nearest neighbor search and mutual verification on 3D points of the first feature matching pairs. The determining the relative pose comprises determining the relative pose based on the second feature matching pairs.

The feature matching results further include third feature matching pairs. The relative pose includes a coarse relative pose and a fine matching pose. The acquiring the feature matching results further includes: estimating the coarse relative pose between the query image and the search image based on the second feature matching pairs; and determining the third feature matching pairs between the 3D point sets of the query image and the 3D point sets of the search image by projecting the 3D point sets of the search image onto a coordinate system of the query image according to the coarse relative pose. The determining of the fine relative pose includes determining the relative pose based on the third feature matching pairs.

The determining of the relative pose includes estimating a prior relative pose between the query image and the search image based on the feature matching results; determining local points of the search image corresponding to keypoints of the query image based on the prior relative pose, and generating point matching pairs based on the local points corresponding to the keypoints; and estimating the relative pose based on the point matching pairs.

The method further includes acquiring an optimized global map by optimizing a current global map based on the relative pose.

The acquiring the optimized global map includes: determining pose drift information based on the relative pose; and acquiring the optimized global map by determining an optimization strategy based on the pose drift information and optimizing the current global map according to the optimization strategy.

The acquiring the optimized global map further includes: acquiring the optimized global map by adjusting a prior global map through incremental bundle adjustment when the pose drift information satisfies a preset error condition; or acquiring the optimized global map by adjusting the prior global map through full bundle adjustment when the pose drift information does not satisfy the error condition.

The acquiring the optimized global map further includes acquiring a first global map by optimizing a multi-degree-of-freedom pose of a keyframe of the prior global map based on the relative pose; and acquiring the optimized global map by optimizing a keyframe pose and map points of the first global map through whole bundle adjustment.

An electronic device includes: at least one processor; a memory; and at least one application program stored in the memory and configured to be executed by the at least one processor, the at least one application program being configured to: acquire a search image based on a query image, acquire first spatial features of the query image and second spatial features of the search image, and estimate a relative pose between the query image and the search image based on the first spatial features and the second spatial features.

A computer-readable storage medium having recorded thereon a program for executing the method including: acquiring a search image based on a query image, acquiring first spatial features of the query image and second spatial features of the search image, and estimating a relative pose between the query image and the search image based on the first spatial features and the second spatial features.

A simultaneous localization and mapping (SLAM) method includes: receiving a query image at an electronic device; receiving, at the electronic device, a search image selected from a candidate image set having a plurality of candidate images, the search image selected from the plurality of candidate images by determining a candidate image of the plurality of images most semantically similar to the query image; determining a first three dimensional (3D) coordinate point data set corresponding to the query image; determining a second 3D coordinate point data set corresponding to the search image; calculating a relative pose between the first 3D coordinate point data set and the second 3D coordinate point data set; optimizing a global map via incremental bundle adjustment only when pose drift information satisfies a preset error condition, the pose drift information being based on the relative pose; and optimizing the global map via full bundle adjustment only when the pose drift information does not satisfy the preset error condition.

Determining each of the first 3D coordinate data point set and the second 3D coordinate data point set includes stereo matching image feature points. The image feature points comprise image keypoints and feature descriptors.

The determining each of the first 3D coordinate data point set and the second 3D coordinate data point set further includes triangulation using an epipolar constraint.

The calculating the relative pose comprises: acquiring feature matching results by matching 3D coordinate data of the first 3D coordinate data point set with 3D coordinate data of the second 3D coordinate data point set to form a plurality of feature matching pairs; and determining the relative pose based on the feature matching results including first feature matching pairs of the plurality of feature matching pairs, the first feature matching pairs determined by clustering the 3D coordinate data of the first 3D coordinate data point set and the 3D coordinate data of the second 3D coordinate data point set.

The feature matching results further include second feature matching pairs of the plurality of feature matching pairs, the second feature matching pairs determined by performing nearest neighbor search and mutual verification on 3D points of the first feature matching pairs.

The feature matching results further include third feature matching pairs of the plurality of feature matching pairs, the third feature matching pairs determined by projecting the 3D point coordinate data of the second 3D coordinate data point set onto a coordinate system of the query image according to a coarse relative pose, the coarse relative pose corresponding to the second feature matching pairs.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a schematic diagram illustrating a method performed by an electronic device according to an embodiment;

DETAILED DESCRIPTION

Figure 1:
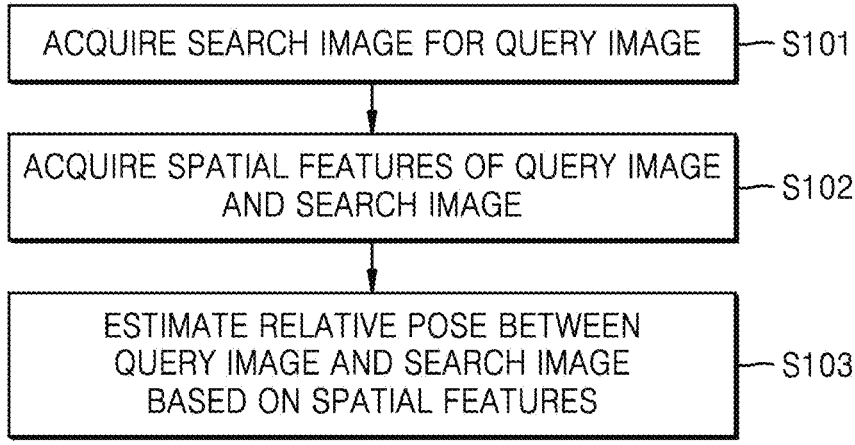
FIG. 1 is a flowchart illustrating a method performed by an electronic device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described. The embodiments are shown in the accompanying drawings in which like reference numerals denote like elements. The embodiments described with reference to the drawings are examples for describing the present disclosure and do not limit the scope of the present disclosure.

As used herein, the singular forms "a," "an" and "the" are intended to include the plural forms as well, unless the context clearly indicates otherwise. The term "include" or "comprise" used herein specifies the presence of a property, a fixed number, a step, a process, an element, a component, and a combination thereof, but does not exclude the presence or addition of other properties, fixed numbers, steps, processes, elements, components, and combinations thereof.

When a component or element is referred to as being "connected" or "coupled" to another component or element, the component or element may be directly connected to the other component or element, or may be connected to the other components or elements with intervening components or elements being therebetween. Furthermore, in the present disclosure, "connection" or "coupling" may include wireless connection or wireless coupling. In the present disclosure, the term "and/or" includes any and all combinations of one or more of the associated listed items.

Objectives, technical solutions, and effects of the present disclosure will be clearly understood from the following descriptions of embodiments with reference to the accompanying drawings.

Simultaneous localization and mapping (SLAM) refers to a technique for creating a real-time three dimensional (3D) map of a space in which a device is located by using a camera and a sensor, such as an inertial measurement unit of the device, and identifying the location and orientation of the device in the 3D map. Cameras and inertial measurement units are inexpensive compared to light detection and ranging (LiDAR) sensors, and are usable in various situations as standard components of devices, such as mobile phones, augmented reality glasses, and indoor robots. In addition, the main goals of previous research into SLAM are to create maps and acquire the pose of a device in real time by using cameras and inertial measurement units as sensors. Compared with 3D maps prepared using mono-cameras, 3D maps prepared using stereo-cameras have more realistic physical scales. Thus, in practical applications, visual sensors provided on devices are often stereo-cameras.

The existing SLAM systems, which are mainly based on the theory of multiple-view geometry, acquire the pose (3D spatial location and orientation) of a device and 3D environment information by tracking and matching image point features. Time-sequential point features of motion pictures are estimated and matched according to multi-view geometric principles, and the point features of stereo images are matched according to epipolar constraints. Finally, these matchings establish a geometric constraint relationship between the pose of a device and the 3D map points, and the pose of a device and 3D map points may be acquired through filtering or cluster adjustment.

Due to errors in camera calibration and feature matching, visual SLAM results in unavoidable cumulative errors during map creation and location estimation. Drift-free location estimation and accurate global map preparation are challenges to be solved. To address these challenges, a SLAM system may additionally include a loop closing (LC) module. The LC module reduces cumulative errors by identifying a common view relationship between the current frame and a prior frame and optimizing a global map, thereby realizing drift-free simultaneous localization. Thus, SLAM systems may include such LC modules as main modules for significant improvements in SLAM performance.

LC is generally divided into three stages. A first stage is similar to image searching and aims to search for images semantically similar to a query image. In the first stage, displaying of proper images is required, and most methods for the first stage are based on a bag of words (BoW) model. A second stage is to form visual constraints through feature matching, such as BoW or Oriented Fast and Rotated Binary Robust Independent Elementary Features (ORB) matching and projection matching, and then to estimate the relative pose between a query image and a search image. A third stage is to optimize a global map to realize drift-free location estimation.

Recently, research into LC has been conducted. In some related techniques, four-degree-of-freedom (4DOF) pose graph optimization has been proposed to optimize the global coincidence between the keyframe pose and the current frame pose in a global map. The 4DOF pose graph optimization is a fast method of optimizing the global correspondence of a keyframe pose. However, this method fails to maintain one global map and thus decreases the accuracy of optimization. Furthermore, in some related techniques, checking of the temporal coincidence of three keyframes is replaced with checking of the local coincidence between a query keyframe and three common view keyframes, thereby improving LC recovery. However, when variations in the field of view of a camera are relatively large and perceptual aliasing occurs in a scene, there may be relatively few relative pose inliers between query and search keyframes, and thus, LC may also fail. In addition, it takes a relatively long time to optimize a global map by full bundle adjustment (FBA). Some related techniques propose a feature re-identification method in which a proposed sub-map having a spatiotemporally sensitive prior pose facilitates fast identification of prior features. However, when the prior pose has low reliability, a drift-free camera pose is obtainable through the combination of LC with feature re-identification. In addition, when camera drift is relatively large, feature re-identification does not work. Therefore, there is a high possibility of LC failure due to large viewpoint changes of a camera and perceptual aliasing in a scene. In addition, when camera drift is relatively large, incremental bundle adjustment (IBA) is not sufficient for optimizing a global map.

Therefore, there are several challenges for accurate and reliable LC. First, feature matching is performed by considering local features in small blocks, such as ORB, binary robust independent elementary features (BRIEF), speeded up robust features (SURF), or scale-invariant feature transform (SIFT), instead of considering hierarchical and spatial information having a wide detection field of view. This may lead to LC instability when there are large variations in the field of view of a camera and perceptual aliasing in a scene. Feature matching based on deep learning usually focuses on learning better sparse detectors and local descriptors from data by using convolutional neural networks (CNNs). Some recent work with this trend addresses various multi-view geometric challenges requiring high-quality feature correspondence by jointly searching for correspondence relationships and rejecting unmatchable points to match two-set local-feature neural networks. However, deep learning methods require large amounts of computing resources. Next, global map optimization is not reliably guaranteed by a single optimization method. For example, when camera drift is large, IBA is insufficient for global map optimization, FBA is resource-consuming work for global map optimization, and a pose optimization method fails to maintain an accurate global map.

Hereinafter, technical methods for addressing the technical challenges described above are described according to embodiments. The following embodiments may be combined with each other, and descriptions of the same or similar concepts or processes may not be repeated.

Hereinafter, embodiments will be described with reference to the accompanying drawings.

Embodiments provide practicable methods, and for example, the embodiment shown in FIG. 1 provides a method performed by an electronic device. The method may include the following operations.

In operation S101, a search image is acquired with respect to a query image.

Here, the query image may be an image (for example, an image of a scene in a current frame) collected by the electronic device while the electronic device performs SLAM. The query image may be received from another device.

In an embodiment, query images may be collected in real time or periodically. The query images may be acquired automatically without user input or manually based on user input. In addition, query images may be collected by an event trigger. The event trigger may be automatically detected by, for example the electronic device, or may be initiated by manually by a user. The process of acquiring query images is not limited.

In an embodiment, during a SLAM process of the electronic device, an image data set is constructed for each keyframe, an image data set corresponding to a query image is acquired, and a search image is acquired by searching a plurality of candidate images included in the image data sets for data semantically similar to the query image.

In this case, one or more search images may be acquired. In the present disclosure, the number of search images is not limited.

For example, the search image may be acquired by searching the candidate images based on a BoW model.

In operation S102, spatial features of the query image and spatial features of the search image are acquired.

In this case, the spatial features may include 3D point sets.

In some embodiments, operation S102 of acquiring spatial features of the query image and spatial features of the search image may include, as operations of acquiring spatial features of any one of the query image and the search image, (1) extracting image feature points, which include image keypoints and feature descriptors; and (2) estimating 3D point sets by performing stereo matching on the image feature points.

In this case, the feature descriptors may be, for example, ORB descriptors.

In operation (2), 3D point sets of the query image and 3D point sets of the search image may be estimated by performing stereo matching and triangulation using an epipolar constraint.

In operation S103, a relative pose between the query image and the search image is estimated based on the spatial features.

In some embodiments, matching between the spatial features of the query image and the spatial features of the search image is performed at least once to acquire feature matching results, and the relative pose may be determined based on the feature matching results.

In operation S103, coarse-to-fine multilayer matching may be performed on the 3D point sets of the query image and the 3D point sets of the search image, and the relative pose may be determined based on final matching results. A method of determining a relative pose is described below.

In some embodiments, the relative pose between the query image and the search image may be estimated based on the spatial features of the query image and the spatial features of the search image. The spatial features may include a wide detection field-of-view hierarchy and spatial information, thereby enabling more accurate optimization of a global map.

In some embodiments, the keypoints and ORB descriptors may be densely and uniformly extracted from the query image and the search image, and then the 3D point sets may be estimated by completing stereo matching and triangulation using an epipolar constraint. Because the 3D point sets are more uniformly and densely distributed in space than in the global map, the relative pose may be more accurately determined for optimization of the global map.

Hereinafter, a process of determining the relative pose is described according to the below embodiments.

In some embodiments, the feature matching results may include first feature matching pairs, and the acquiring of the feature matching results by matching at least once the spatial features of the query image and the spatial features of the search image may include generating the first feature matching pairs by clustering the 3D point sets of the query image, clustering the 3D point sets of the search image, and matching results of the clustering of the query image to results of the clustering of the search image.

In some embodiments, points of the 3D point sets are clustered into cubes according to a spatial distribution.

A centroid descriptor $D_C$ of each cluster is acquired by a voting function $V(\bullet)$ of all 3D point descriptors $D_{P_1}, \ldots, D_{P_i}, \ldots, D_{P_n}$ in a cube by considering spatial information at a wider detection field of view.

$$D_C = V\left(\sum_{i=1}^{n} D_{P_i}\right) \qquad \text{[Equation 1]}$$

$$V(X) = \begin{cases} 1, & X_j \geq n/2 \\ 0, & \text{other} \end{cases} \qquad \text{[Equation 2]}$$

where $D_C$ refers to the centroid descriptor $D_C$ of each cluster, $D_{P_1}, \ldots, D_{P_i}, \ldots, D_{P_n}$ refer to 3D point descriptors of the cube, and $V(X)$ refers to a voting function.

In some embodiments, the generating of the first feature matching pairs by clustering the 3D point sets of the query image, clustering the 3D point sets of the search image, and matching results of the clustering of the query image to results of the clustering of the search image may include: determining one or more first cubes generated by clustering the 3D point sets of the query image; determining one or more second cubes generated by clustering the 3D point sets of the search image; determining a first cluster centroid of each of the first cubes and a second cluster centroid of each of the second cubes; and determining second cluster centroids respectively matching the first cluster centroids of the first cubes, and determining the first feature matching pairs based on the first and second cluster centroids, which match each other.

Figure 2:
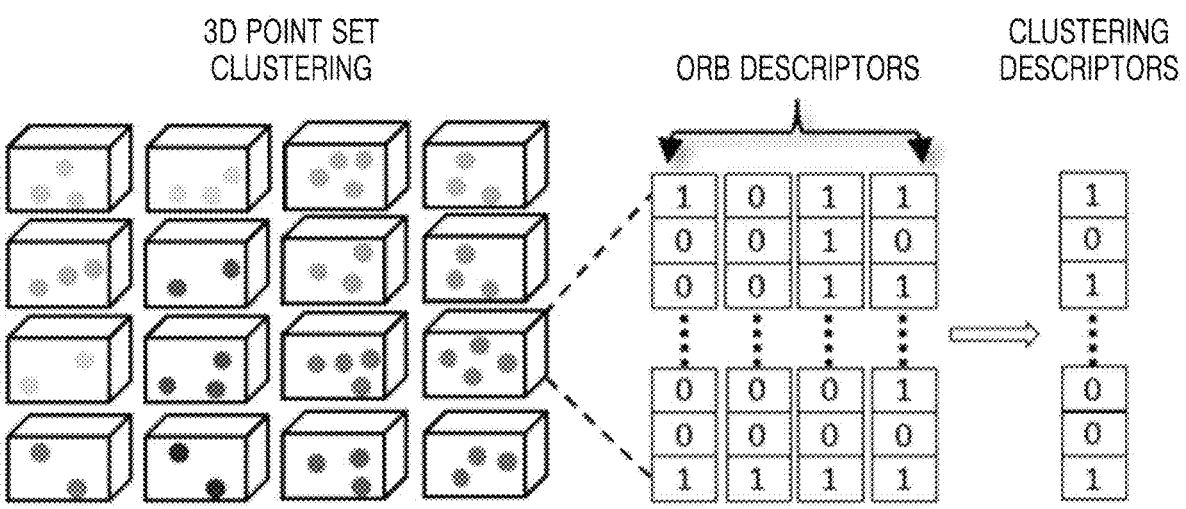
FIG. 2 is a schematic diagram illustrating a method of clustering 3D point sets according to an embodiment.

As in the embodiment shown in FIG. 2, the first dimension of ORB descriptors (i.e., first row with descriptors "1" "0" "1" "1") has more "1"s than "0"s. Thus, the first dimension of cluster centroid descriptors may be determined to be "1". After 3D point set clustering, the cluster centroid descriptor of each cube may be acquired.

$$D_{C_i}^q (i \leq m^q)$$

refers to cluster centroid descriptors of the query image, and $$D^r_{C_j}(j \le m^r)$$

refers to cluster centroid descriptors of the search image. Next, coarse matching pairs, that is, first feature matching pairs between cubes of the query image and the search image, are acquired through nearest neighbor search and mutual verification $$M^{q \leftrightarrow r}_C.$$

$$M^{q \to r}_{C_i} \left\{ \begin{array}{ll} j, \min_{1 \le j \le m^r} H\left(D^q_{C_i}, D^r_{C_j}\right) \le \mu & \text{[Equation 3]} \\ 0, \text{other} \end{array} \right.$$

$$M^{r \to q}_{C_j} \left\{ \begin{array}{ll} i, \min_{1 \le i \le m^q} H\left(D^r_{C_j}, D^q_{C_i}\right) \le \mu & \text{[Equation 4]} \\ 0, \text{other} \end{array} \right.$$

$$M^{q \leftrightarrow r}_{C_{i,j}} = \left\{ \begin{array}{ll} 1, M^{q \to r}_{C_i} == j \,\&\, M^{r \to q}_{C_j} == i & \text{[Equation 5]} \\ 0, \text{other} \end{array} \right.$$

In Equations 3 to 5, $$D^q_{C_i}(i \le m^q)$$

refers to cluster centroid descriptors of the query image, $$D^r_{C_j}(j \le m^r)$$

refers to cluster centroid descriptors of the search image, $H(\cdot)$ refers to Hamming distance, $\mu$ refers to the threshold of the Hamming distance, $$M^{q \to r}_{C_i}$$

refers to search for the nearest neighbor from a cluster centroid feature of the query image to a cluster centroid feature of the search image, $$M^{r \to q}_{C_j}$$

refers to search for the nearest neighbor from a cluster centroid feature of the search image to a cluster centroid feature of the query image, and $$M^{q \leftrightarrow r}_{C_{i,j}}$$

refers to verification of cluster centroid features of the query image and cluster centroid features of the search image.

Figure 3:
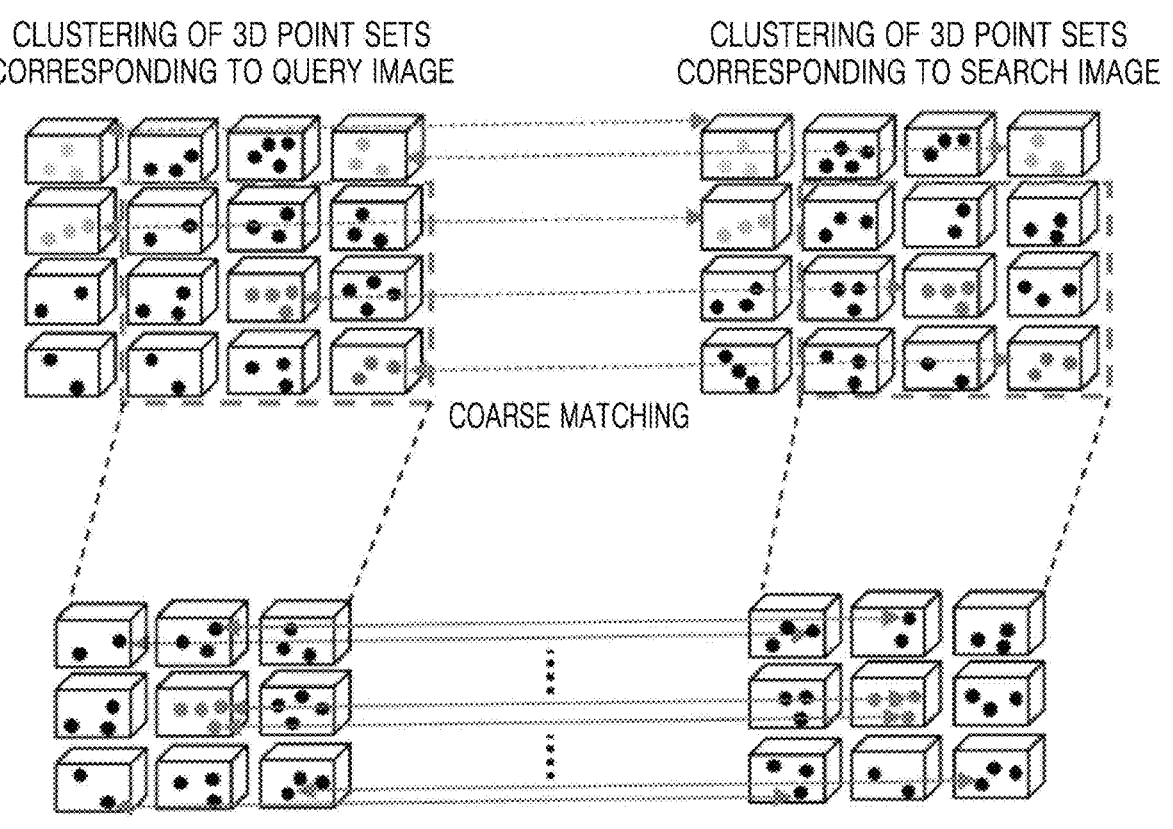
FIG. 3 is a schematic diagram illustrating a method of generating first feature matching pairs and second feature matching pairs according to an embodiment.

In FIG. 3, cubes connected by dashed-line double-headed arrows refer to coarse matching pairs between the query image and the search image.

In some embodiments, first feature matching pairs between cubes may be acquired by performing coarse matching on the query image and the search image, and the relative pose between the query image and the search image may be estimated directly based on the first feature matching pairs.

In some embodiments, first feature matching pairs between cubes may be acquired by performing coarse matching on the query image and the search image, and then second feature matching pairs between the 3D point sets may be acquired by further performing fine matching.

In operation S103 (e.g., as seen in FIG. 1), the feature matching results may include second feature matching pairs, wherein the acquiring of the feature matching results by matching at least once the spatial features of the query image and the spatial features of the search image may further include acquiring second feature matching pairs between the 3D point sets of the query image and the 3D point sets of the search image by performing nearest neighbor search and mutual verification on the 3D points of first feature matching pair regions, and the determining of the relative pose based on the feature matching results may include estimating the relative pose based on the second feature matching pairs.

In other words, nearest neighbor search and mutual verification may be performed on all the 3D points $$D^q_{P_k \in C^{3 \times 3 \times 3}_i}$$

and $$D^r_{P_l \in C^{3 \times 3 \times 3}_j}(k \le n^q, l \le n^r),$$

and, $$C^{3 \times 3 \times 3}_i$$

and $$C^{3 \times 3 \times 3}_j$$

respectively refer to a set of 27 cubes in an i-th-cube spatial region and a set of 27 cubes in a j-th-cube spatial region. Next, a coarse relative pose $\Delta T$ between the query image and the search image is estimated based on the second feature matching pairs.

$$M^{q \to r}_{P_k} = \left\{ \begin{array}{ll} l, \min_{1 \le l \le n^r} H\left(D^q_{P_k}, D^r_{P_l}\right) \le \mu & \text{[Equation 6]} \\ 0, \text{other} \end{array} \right.$$

$$M^{r \to q}_{P_l} = \left\{ \begin{array}{ll} k, \min_{1 \le k \le n^q} H\left(D^r_{P_l}, D^q_{P_k}\right) \le \mu & \text{[Equation 7]} \\ 0, \text{other} \end{array} \right.$$

$$M^{q \leftrightarrow r}_{P_{k,l}} = \left\{ \begin{array}{ll} 1, M^{q \to r}_{P_k} == l \,\&\, M^{r \to q}_{P_l} == k & \text{[Equation 8]} \\ 0, \text{other} \end{array} \right.$$

In Equations 6 to 8, $$D^q_{P_k}$$

is $$D^q_{P_k \in C^{3 \times 3 \times 3}_i}, D^r_{P_l} \text{ is } D^r_{P_l \in C^{3 \times 3 \times 3}_j}, , M^{q \to r}_{P_k}$$

refers to nearest neighbor search from the 3D point features of the query image to the 3D point features of the search image, $$M^{r \to q}_{P_l}$$

refers to nearest neighbor search from the 3D point features of the search image to the 3D point features of the query image, and $$M^{q \leftrightarrow r}_{P_{k,l}}$$

refers to verification of the 3D point features of the query image and the 3D point features of the search image.

In some embodiments, after performing coarse matching between the query image and the search image to acquire first feature matching pairs between cubes and further performing fine matching to acquire second feature matching pairs between 3D point sets, a coarse relative pose between the query image and the search image may be estimated directly based on the second feature matching pairs, and the coarse relative pose may be set as a relative pose between the query image and the search image.

In some embodiments, after performing coarse matching between the query image and the search image to acquire first feature matching pairs between cubes and further performing fine matching to acquire second feature matching pairs between 3D point sets, pose guide matching may be further performed to acquire third feature matching pairs.

The feature matching results may further include third feature matching pairs, and the acquiring of the feature matching results by matching at least once the spatial features of the query image and the spatial features of the search image may include: estimating a coarse relative pose between the query image and the search image based on the second feature matching pairs; and projecting the 3D point sets of the search image onto the coordinate system of the query image based on the coarse relative pose to determine third feature matching pairs between the 3D point sets of the query image and the 3D point sets of the search image.

The determining of the relative pose based on the feature matching results may include determining the relative pose based on the third feature matching pairs.

Figure 4:
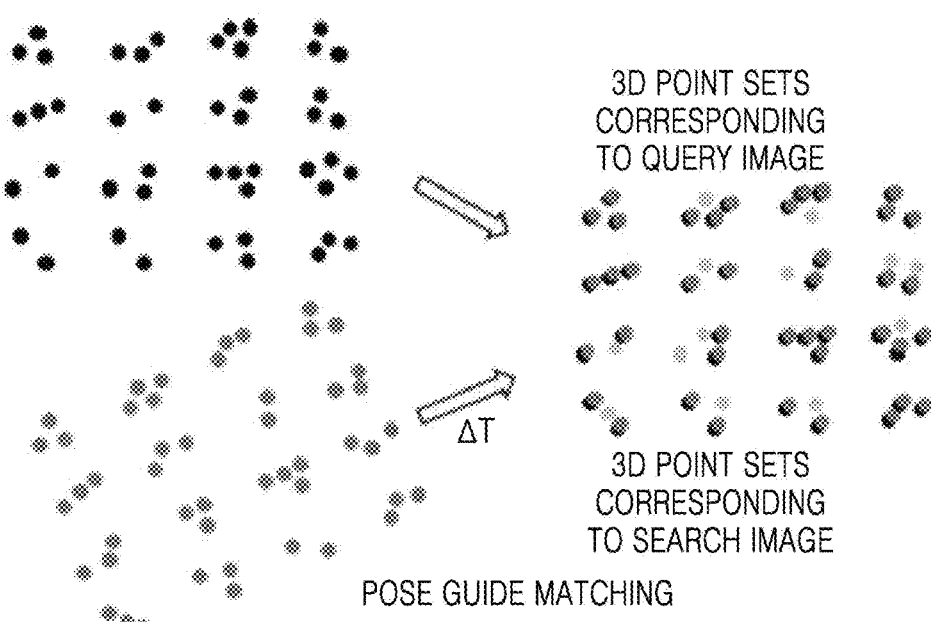
FIG. 4 is a schematic diagram illustrating a method of generating third feature matching pairs according to an embodiment.

In the embodiment shown in FIG. 4, after 3D points of the search image are projected onto the coordinate system of the query image using the coarse relative pose ΔT, third feature matching pairs between the 3D point sets of the query image and the 3D point sets of the search image are acquired by performing nearest neighbor search and cross-validation according to the distances to point locations and the Hamming distance of ORB descriptors for similarity to fine matching, and finally, a prior relative pose between the query image and the search image is estimated based on the third feature matching pairs. As shown in FIG. 4, there may be overlapping portions between corresponding 3D points of the query image and the search image. Here, the overlapping portions may form the third feature matching pairs, and 3D points that do not overlap at all indicate outliers.

In the previous embodiments, the process of determining feature matching results has been described, and the process of determining a relative pose will now be further described according to embodiments with reference to the accompanying drawings.

In some embodiments, the determining of the relative pose based on the feature matching results may include: estimating a prior relative pose between the query image and the search image based on the feature matching results; determining, based on the prior relative pose, local points of the search image that correspond to the keypoints of the query image, and forming point matching pairs based on the local points corresponding to the keypoints; and estimating the relative pose based on the point matching pairs.

During the process, the local points of the search image corresponding to the keypoints of the query image may be determined using a projection search matching method, and after forming the point matching pairs based on the local points corresponding to the keypoints, the relative pose between the query image and the search image may be estimated using a perspective-n-point (PNP) algorithm.

In the embodiment described above, the process of determining the relative pose has been described, and after the relative pose is acquired, an optimized global map may be acquired according to the relative pose.

In some embodiments, the method performed by an electronic device may further include acquiring an optimized global map based on a relative pose.

In some embodiments, IBA and FBA may be combined to acquire an optimized global map, and it may be determined, based on the relative pose, whether to select IBA or FBA for improving the accuracy of optimization.

In some embodiments, the acquiring of the optimized global map based on the relative pose may include optimizing the current global map based on the relative pose to acquire the optimized global map.

In some embodiments, during SLAM, a previously optimized global map may be re-optimized based on a relative pose as a method of continuously optimizing a global map. That is, an optimized global map may be acquired by optimizing the current global map.

In some embodiments, the acquiring of the optimized map by optimizing the current global map based on the relative pose may include: determining pose drift information based on the relative pose; and determining an optimization strategy based on the pose drift information and optimizing the current global map according to the optimization strategy to acquire the optimized global map.

In this case, the pose drift information includes at least one selected from the group consisting of a drift angle, a drift distance, and the number of closed loops of similar drifts.

In this case, the optimization strategy may include IBA and/or FBA.

Hereinafter, a process of determining pose drift information is described according to some embodiments.

In some embodiments, when a loop is successfully detected, pose drift $T_{drift}$ is calculated by the following equation.

$$T_{drift} = \begin{bmatrix} R_{drift} & t_{drift} \\ 0 & 1 \end{bmatrix} = \Delta T_{loop} \cdot (\Delta T_{SLAM})^{-1} \qquad \text{[Equation 9]}$$

In Equation 9, $\Delta T_{SLAM}$ refers to estimating a relative pose between the query image and the search image by a SLAM method, $R_{drift}$ refers to a rotational drift, and $t_{drift}$ refers to a translational drift. A drift angle $A_{drift}$ and a distance $D_{drift}$ may be calculated by $R_{drift}$ and $t_{drift}$.

In some embodiments, to determine the accuracy of a relative pose of an LC module, an LC drift error $$T_{error}^{k}$$

between the current query image and a query image $k \in [q_{th}-10, q_{th})$ in a time window and the current query image is calculated, and a pose drift is calculated by the following equation.

$$T_{error}^{k} = \begin{bmatrix} R_{error}^{k} & t_{error}^{k} \\ 0 & 1 \end{bmatrix} = T_{drift}^{k} \cdot (T_{drift}^{q_{th}})^{-1} \qquad \text{[Equation 10]}$$

In Equation 10, $q_{th}$ refers to an index of the current query image, $R_{error}$ refers to a rotational drift error, and $t_{error}$ refers to a translational drift error.

In some embodiments, an angle of error $$A_{error}^{t}$$

and a distance of error $$D_{error}^{t}$$

may be calculated by $$R_{error}^{t}$$

and $$t_{error}^{t}.$$

Finally, statistics are acquired on the number $N_{TCL}$ of temporally coincident loops in a time window. An $N_{TCL}$ greater than or equal to a threshold value $\eta$ may indicate that an estimated relative pose $\Delta T_{loop}$ is sufficiently accurate when satisfying temporal coincidence.

$N_{TCL}$ is expressed by the following equation.

$$N_{TCL} = \sum_{k=q_{th}-10}^{q_{th}-1} \begin{cases} 1, & A_{error}^{k} < \beta/2 \ \& D_{error}^{k} < \tau/2 \\ 0, & \text{other} \end{cases} \qquad \text{[Equation 11]}$$

In Equation 11, $N_{TCL}$ refers to the number of temporally coincident loops in a time window.

The process of determining pose drift information has been described above, and a process of acquiring an optimized global map based on pose drift information is described as follows according to some embodiments.

In some embodiments, the process of determining an optimization strategy based on pose drift information and optimizing the current global map according to the optimization strategy to acquire an optimized global map may include: acquiring the optimized global map by adjusting the prior global map by IBA when the pose drift information satisfies a preset error condition, and acquiring the optimized global map by adjusting the prior global map by FBA when the pose drift information does not satisfy the preset error condition.

In other words, when the pose drift information satisfies the preset error condition, an optimized global map is acquired by adjusting the prior global map by IBA based on the point matching pairs, and when the pose drift information does not satisfy the preset error conditions, an optimized global map is acquired by adjusting the prior global map by FBA, based on the relative pose and the point matching pairs.

In some embodiments, the following optimization strategy is executed according to the angle $A_{drift}$ and the distance $D_{drift}$ of a drift and the number $N_{TCL}$ of temporally coincident loops which are acquired as described above.

$$HBA = \begin{cases} IBA, & A_{drift} < \beta \ \& D_{drift} < \tau | N_{TCL} < \eta \\ FBA, & \text{other} \end{cases} \qquad \text{[Equation 12]}$$

In Equation 12, IBA refers to IBA, and FBA refers to FBA.

When the drift of a camera is very small ($A_{drift}$ and $D_{drift}$ are below certain threshold values $\beta$ and $\tau$) or the temporal consistence of the estimated relative pose $\Delta T_{loop}$ has not yet been verified ($N_{TCL}$ is less than a predetermined threshold value $\eta$), only a point matching pair constraint is added, and then the poses and map points of relevant keyframes are optimized by IBA. Alternatively, when the cumulative error of the current SLAM system is relatively large and an estimated relative pose $\Delta T_{loop}$ satisfies temporal consistence and is sufficiently accurate, an estimated relative pose $\Delta T_{loop}$ and a point matching pair constraint are added, and the poses of all keyframes and all map points are optimized by FBA.

In some embodiments, the operation of adjusting a prior global map and acquiring an optimized global map by FBA may include: acquiring a first global map by optimizing a multi-degree-of-freedom pose of a keyframe of the prior global map based on a relative pose; and acquiring an optimized global map by optimizing the keyframe pose and map points of the first global map by FBA.

Figure 5:
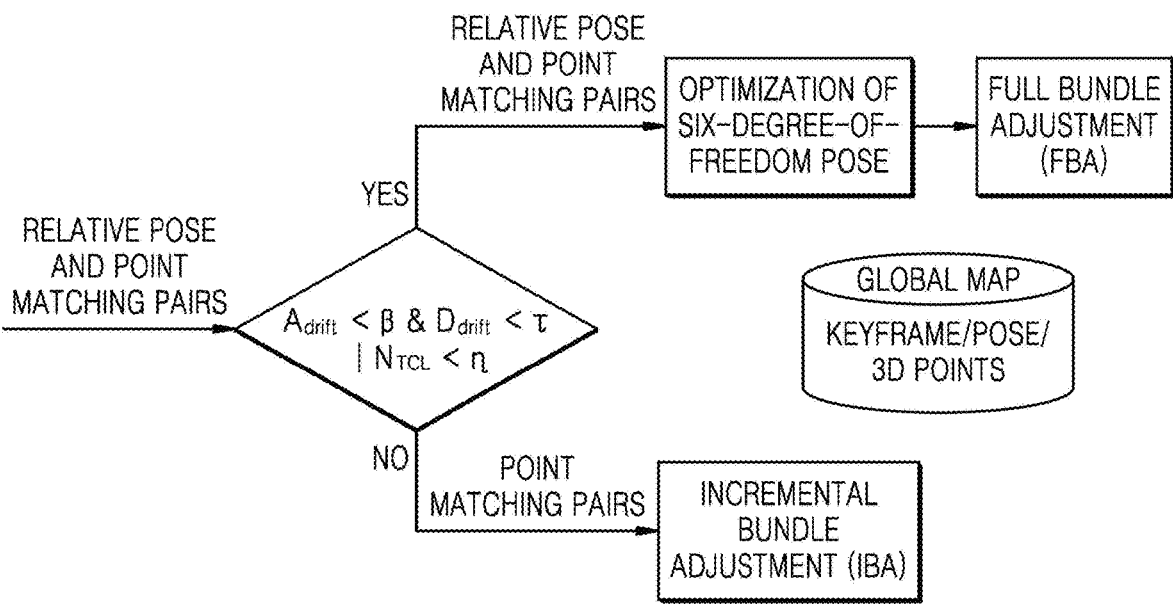
FIG. 5 is a schematic diagram illustrating a method of generating an optimized global map according to an embodiment.

As shown in FIG. 5, six-degree-of-freedom poses of all keyframes are first optimized, and then the poses of all the keyframes and map points may be optimized by FBA.

In some embodiments, the method performed by an electronic device may include: acquiring a search image with respect to a query image; determining a relative pose between the query image and the search image; determining pose drift information based on the relative pose; and acquiring an optimized global map by determining an optimization strategy based on the pose drift information and optimizing the current global map according to the optimization strategy.

In some embodiments, the determining of the relative pose between the query image and the search image may include forming a visual constraint between the query image and the search image through feature matching, and estimating the relative pose between the query image and the search image.

In some embodiments, feature matching may be BoW and ORB feature matching, projection matching, or the like.

In some embodiments, the determining of the relative pose between the query image and the search image may include: acquiring spatial features of the query image and spatial features of the search image; and estimating the relative pose between the query image and the search image based on the spatial features.

In some embodiments, feature matching results may be acquired by matching the spatial features of the query image with the spatial features of the search image at least once, and the relative pose may be estimated again based on the feature matching results.

During the operations, multilayer coarse-to-fine matching may be performed on 3D point sets of the query image and 3D point sets of the search image, and the relative pose may be determined based on final matching results. Methods of determining the relative pose are described above and thus are not described here.

In some embodiments, when the pose drift information satisfies a preset error condition, the optimized global map is acquired by adjusting the prior global map through IBA, and when the pose drift information does not satisfy the error condition, the optimized global map is acquired by adjusting the prior global map through FBA.

Hereinafter, the method performed by an electronic device is described according to embodiments.

Figure 6:
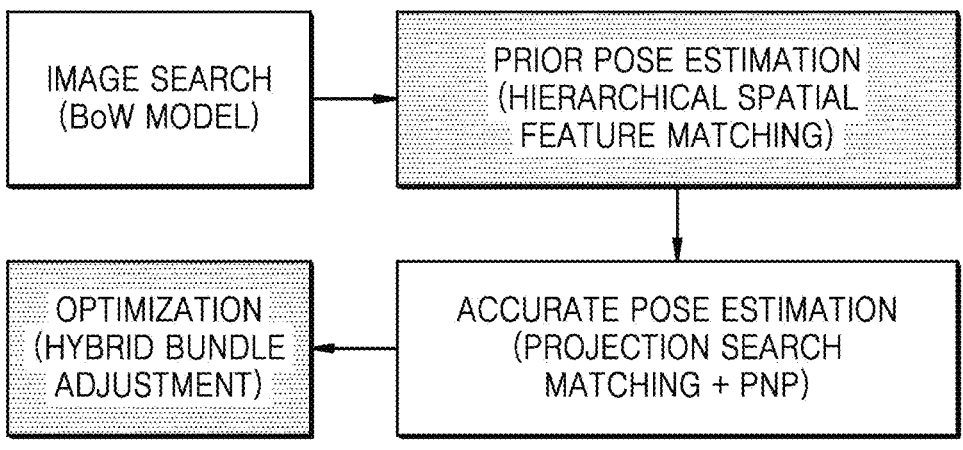
FIG. 6 is a schematic block diagram illustrating an electronic device according to an embodiment.

In an embodiment, as shown in FIG. 6, according to an embodiment, the electronic device may include: an image search module configured to search an image data set corresponding to a keyframe for a search image semantically similar to a query image; a prior relative pose estimation module configured to estimate a prior relative pose between the query image and the search image; a precise relative pose estimation module configured to precisely estimate a relative pose constraint between the query image and the search image and form a constraint between keypoints of the query image and corresponding local map points of the search image; and an optimization module configured to precisely estimate an optimized global map by performing additional optimization according to a newly added constraint.

Hereinafter, the method performed by an electronic device is further described according to embodiments.

Figure 7:
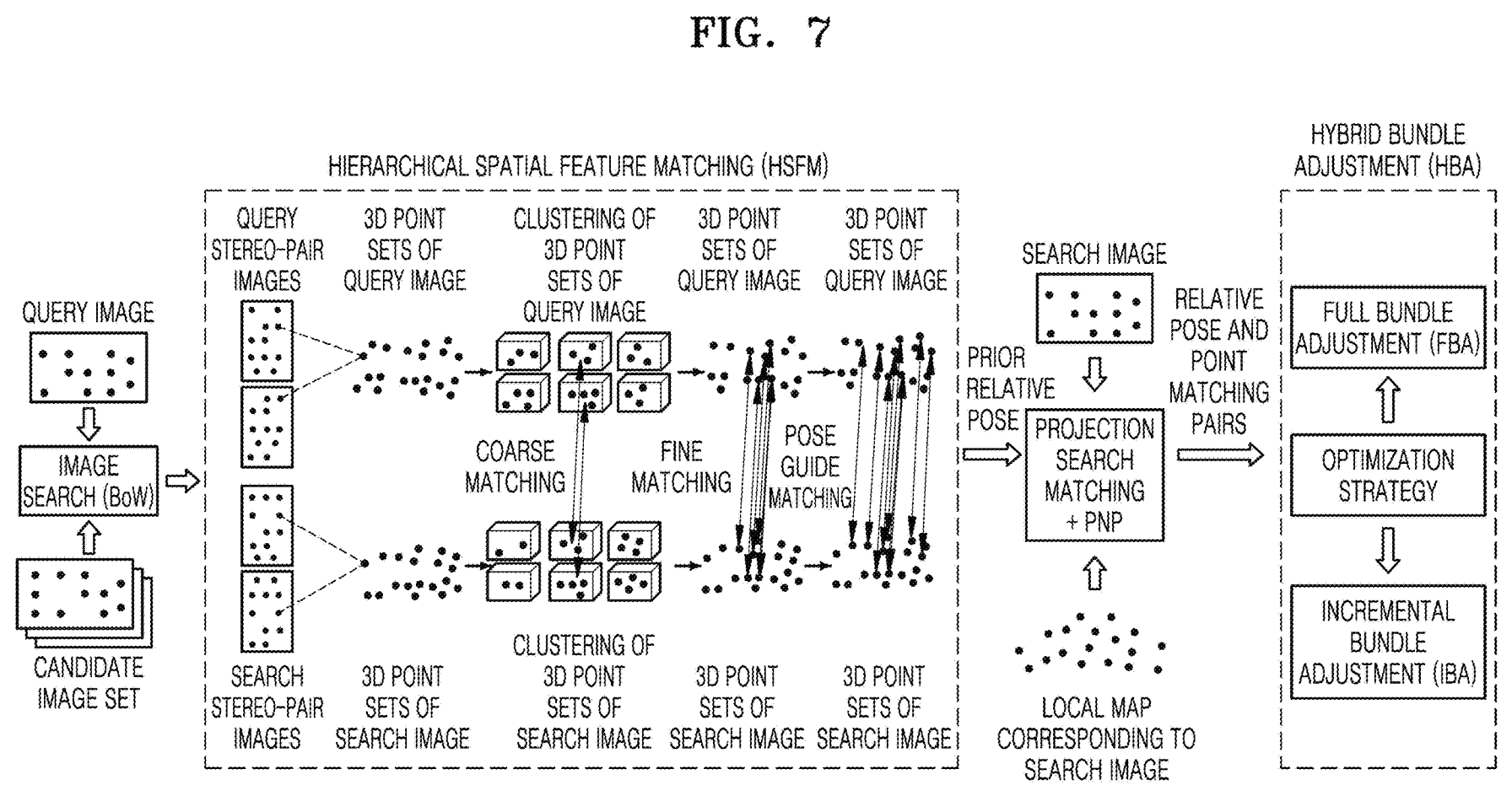

As shown in FIG. 7, according to an embodiment, the method performed by an electronic device may include: searching an image data set according to a BoW model for a search image (that is, a search image shown in FIG. 7) semantically similar to a query image (that is, a query image shown in FIG. 7); generating 3D point sets of the query image and 3D point sets of the search image; forming one or more first cubes by clustering the 3D point sets of the query image, and one or more second cubes by clustering the 3D point sets of the search image; determining a first cluster centroid of each of the first cubes and a second cluster centroid of each of the second cubes; forming first feature matching pairs by determining second cluster centroids that respectively match the first cluster centroids and forming pairs based on the first and second cluster centroids that match each other (that is, coarse matching shown in FIG. 7); forming second feature matching pairs between the 3D point sets of the query image and the 3D point sets of the search image based on the first feature matching pairs (that is, fine matching shown in FIG. 7); generating third feature matching pairs between the 3D point sets of the query image and the 3D point sets of the search image by pose guide matching, and generating a prior relative pose; determining point matching pairs between keypoints of the query image and corresponding local points of the search image based on prior relative pose estimation, and estimating a relative pose; and determining an optimization strategy for a prior global map based on the relative pose and the point matching pairs. Thus, the prior global map acquired by SLAM may be optimized by selecting FBA or IBA.

In the example described above, a novel LC method named as an DH-LC having hierarchy and hybrid characteristics is proposed. 3D point set formation, 3D point set clustering, coarse matching, fine matching, and pose guide matching are named as hierarchical spatial feature matching (HSFM); optimization by the combination of IBA and FBA is named as hybrid bundle adjustment (HBA); and in some embodiments, the global map is optimized by estimating the prior relative pose between the query image and the search image and HBA.

For each query image, a search image is acquired according to a BoW model from a candidate image set, and a relative pose between the query image and the search image is estimated by HSFM in a coarse-to-fine order. Thereafter, a projection search matching method is used to complete matching between the keypoints of the query image and the corresponding local map points of the search image, and the relative pose between the query image and the search image is precisely estimated using a PNP algorithm. Finally, the current global map may be effectively optimized through HBA by adaptively selecting IBA or FBA according to the proposed optimization strategy.

The present disclosure proposes HSFM to improve the internal point ratio and efficiency of feature matching. Unlike existing methods that are based on direct local feature matching or feature clustering acceleration matching, the present disclosure provides a method in which keypoints and ORB descriptors are first acquired densely and uniformly from a query image and a search image; corresponding 3D points of the query image and the search image are estimated by performing stereo matching and triangulation using an epipolar constraint; the 3D points are clustered into cubes according to the spatial distribution of the 3D points; a centroid descriptor of each cluster is acquired by voting of all 3D point descriptors of a cube having a larger detection field of view; and a prior relative pose between a keyframe of the query image and the search image is finally estimated by a coarse-to-fine method. After reliable pose estimation and point matching, a global map is optimized. Because both the precision and efficiency are not guaranteed by one optimization method, the present disclosure proposes HBA that combines IBA and FBA for effective, fast, and precise optimization of a global map.

1) In HSFM, 3D points are generated based on coarse-to-fine layer matching and epipolar constraints, and a prior relative pose between a query image and a search image is estimated by spatial clustering.

Compared with the prior art, the method of the present disclosure improves the internal point ratio and efficiency of feature matching.

2) HBA, which combines IBA and FBA, effectively provides an optimized global map in a fast and precise manner.

3) The present disclosure provides a DH-LC method by combining HSFM and HBA. The method improves the recovery rate and efficiency of LC, reduces cumulative errors, and improves the precision of location estimation.

According to the method performed by an electronic device, a relative pose between a query image and a search image is estimated using spatial features of the query image and the search image. Thus, spatial features may include a great perceptual aliasing hierarchy and spatial information, and a global map may be more accurately optimized.

In addition, according to the present disclosure, 3D point sets are estimated by completing stereo matching and triangulation using epipolar constraints after dense and uniform extraction of keypoints and ORB descriptors from images, and thus 3D point sets are more uniformly and densely distributed in space than in a global map. Thus, a relative pose may be more accurately determined for optimization of the global map.

In addition, according to the present disclosure, the global map may be effectively optimized by IBA and FBA in a fast and precise manner.

In the embodiments described above, the method performed by an electronic device is described from the viewpoint of the process flow of the method. Hereinafter, the method is described from the viewpoint of virtual modules. Examples are described below.

Figure 8:
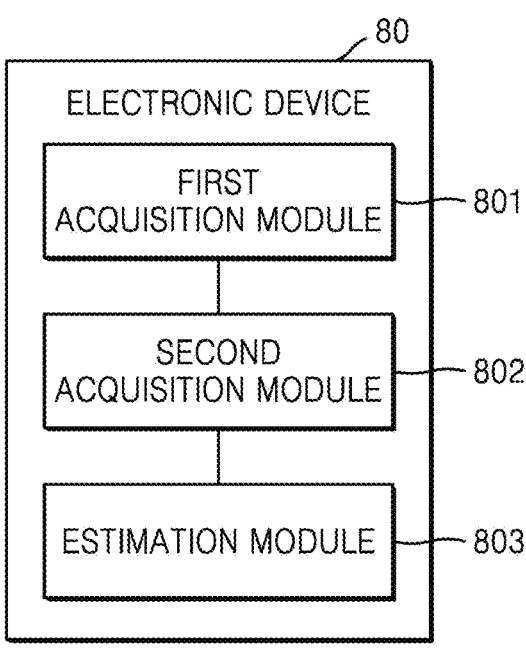
FIG. 8 is a schematic block diagram illustrating an electronic device according to an embodiment.

An embodiment provides an electronic device 80, and the electronic device 80 may include a first acquisition module 801, a second acquisition module 802, and an estimation module 803 as shown in FIG. 8. The first acquisition module 801 is configured to acquire a search image with respect to a query image, the second acquisition module 802 is configured to acquire spatial features of the query image and spatial features of the search image, and the estimation module 803 is configured to estimate, based on the spatial features, a global map optimized in the relative pose between the query image and the search image.

In an embodiment, the spatial features include 3D point sets, and the second acquisition module 802 is configured to acquire spatial features of any one of the query image and the search image, extract image feature points that include image keypoints and feature descriptors, and estimate 3D point sets by performing stereo matching on the image feature points.

In some embodiments, the estimation module 803 is configured to estimate the relative pose between the query image and the search image based on the spatial features.

The estimation module 803 is configured to acquire feature matching results by matching, at least once, the spatial features of the query image and the spatial features of the search image, and determine a relative pose based on the feature matching results.

In an embodiment, the feature matching results include first feature matching pairs, and the estimation module 803 is configured to acquire feature matching results by matching at least once the spatial features of the query image with the spatial features of the search image.

The estimation module 803 is configured to cluster the 3D point sets of the query image and the search image to generate first feature matching pairs between results of the clustering of the query image and results of the clustering of the search image.

In some embodiments, the estimation module 803 clusters the 3D point sets of the query image and the search image to generate first feature matching pairs between the results of the clustering of the query image and the results of the clustering of the search image.

The estimation module 803 is configured to: determine one or more first cubes formed by accumulating the 3D point sets of the query image; determine one or more second cubes formed by accumulating the 3D point sets of the search image; determine a first cluster centroid of each of the first cubes and a second cluster centroid of each of the second cubes; determine second cluster centroids that respectively match the first cluster centroids of the first cubes; and form first feature matching pairs based on the first cluster centroids and the second cluster centroids, which match each other.

In an embodiment, the feature matching results further include second feature matching pairs, and the estimation module 803 acquires feature matching results by matching the spatial features of the query image to the spatial features of the search image at least once.

The estimation module 803 is configured to acquire second feature matching pairs between the 3D point sets of the query image and the 3D point sets of the search image by performing nearest neighbor search and mutual verification on 3D points in the regions of the first feature matching pairs.

In some embodiments, the feature matching results further include third feature matching pairs, and the estimation module 803 acquires feature matching results by matching the spatial features of the query image to the spatial features of the search image at least once.

The estimation module 803 is configured to estimate a coarse relative pose between the query image and the search image based on the second feature matching pairs; project the 3D point sets of the search image into the coordinate system of the query image according to the coarse relative poses; and determine third feature matching pairs between the 3D point sets of the query image and the 3D point sets of the search image.

In some embodiments, the estimation module 803 determines the relative pose based on the feature matching results.

The estimation module 803 is configured to estimate a prior relative pose between the query image and the search image based on the feature matching result; determine local points of the search image that correspond to keypoints of the query image based on the prior relative pose; form point matching pairs based on the local points corresponding to the keypoints; and estimate a relative pose based on the point matching pairs.

In an embodiment, the electronic device 80 may further include an optimization module configured to acquire a global map by optimizing the current global map based on the relative pose.

In an embodiment, the optimization module optimizes the current global map based on the relative pose to acquire an optimized global map.

The optimization module is configured to determine a pose drift based on the relative pose, determine an optimization strategy based on information on the pose drift, and acquire an optimized global map by optimizing the current global map according to the optimization strategy.

In some embodiments, the optimization module determines an optimization strategy based on pose drift information and acquires an optimized global map by optimizing the current global map according to the optimization strategy.

When the pose drift information satisfies a preset error condition, the optimization module acquires an optimized global map by adjusting a prior global map by IBA, and when the pose drift information does not satisfy the error condition, the optimization module acquires an optimized global map by adjusting the prior global map by FBA.

In some embodiments, the optimization module adjusts the prior global map by FBA to acquire an optimized global map.

The optimization module is configured to acquire a first global map by optimizing a multi-degree-of-freedom pose of a keyframe of the prior global map based on the relative pose, and an optimized global map by optimizing a keyframe pose and map points of the first global map by FBA.

The electronic device 80 described above may estimate the relative pose between the query image and the search image by using the spatial features of the query image and the search image. Thus, the spatial features may have a great detection field-of-view hierarchy and spatial information, and the global map may be more accurately optimized.

In addition, after densely and uniformly extracting keypoints and ORB descriptors from images, 3D point sets are estimated by completing stereo matching and triangulation using epipolar constraints. Thus, the 3D point sets may be more uniformly and densely distributed in space than the global map.

In addition, the global map may be effectively optimized by IBA and FBA in a fast and accurate manner.

In an embodiment, the electronic device 80 may execute a method having an implementation principle similar to that of the method described above according to embodiments. The operations executed by the modules of the electronic device 80 according to the embodiments described above may correspond to the operations of the method performed by an electronic device according to the embodiments described above. The functions of the modules of the electronic device 80 may be understood from the description of the method performed by an electronic device, and thus detailed descriptions thereof are omitted.

In an embodiment, the electronic device 80 may be implemented by at least one module based on an artificial intelligence (AI) model. In an embodiment, the electronic device 80 may execute an AI function by using a non-volatile memory, a volatile memory, and a processor.

The processor may include at least one processor. In this case, for example, the at least one processor may include: a general-purpose processor such as a central processing unit (CPU) or an application processor (AP); a dedicated graphic processor such as a graphics processing unit (GPU); a visual processing unit (VPU); and/or an AI processor such as a neural processing unit (NPU).

The at least one processor may control processing of input data according to predefined operation rules or an AI model stored in non-volatile and volatile memories. The predefined operation rules or the AI model is provided through training or learning.

Here, the AI model having predefined optional rules or necessary characteristics may be acquired using a training algorithm and training data. In an embodiment, training may be performed in an AI device itself and/or by a separate server/system.

The AI model may include a plurality of neural network layers. Each of the neural network layers may have a plurality of weights, and calculation may be performed in one layer based on results of calculation in the previous layer and the plurality of weights of the current layer. Examples of the neural network include, but are not limited thereto, CNNs, deep neural networks (DNNs), recurrent neural networks (RNNs), restricted Boltzmann machines (RBMs), deep belief networks (DBNs), bidirectional recurrent deep neural networks (BRDNNs), generative adversarial networks (GANs), and deep Q networks.

The training algorithm is for training a previously set device (for example, a robot) using a large amount of data so as to cause, allow, or control the device to perform determination or estimation operations. Examples of the training algorithm include, but are not limited to, supervised training algorithms, unsupervised training algorithms, semi-supervised training algorithms, and reinforcement training algorithms.

In the above, the electronic device 80 is described from the viewpoint of functional modularization according to some embodiments. Hereinafter, an electronic device is described according to embodiments from the viewpoint of hardware realization, and a calculation system of the electronic device is also described.

Embodiments provide an electronic device based on the same principle as that of the method described in the previous embodiments. The electronic device includes, but is not limited to, a memory storing computer operation instructions and a processor configured to execute any of the methods described in the previous embodiments by calling the computer operation instructions. Compared with the prior art, the method of the present disclosure performed by an electronic device more precisely optimizes a global map.

Figure 9:
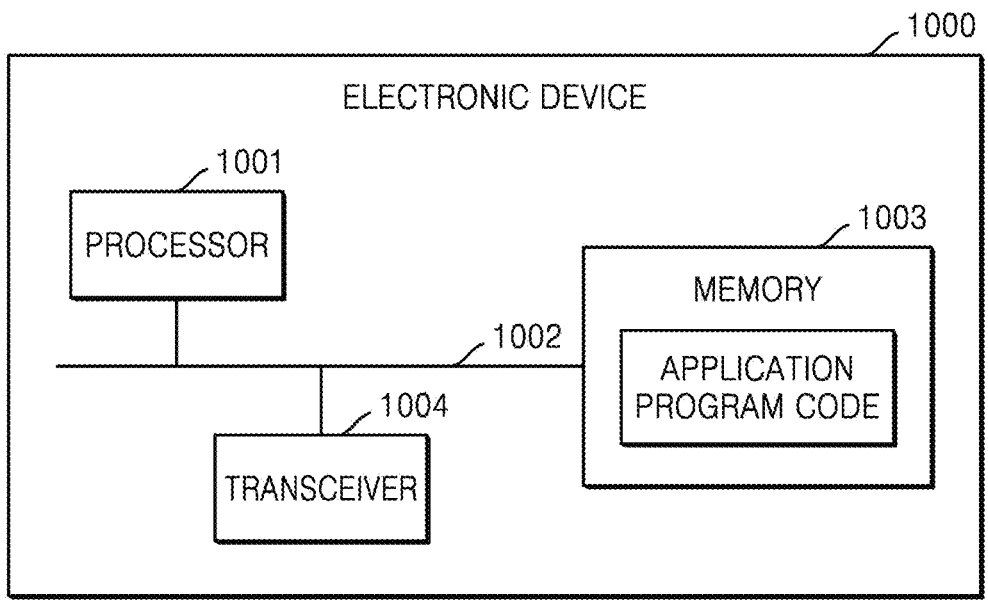
FIG. 9 is a schematic block diagram illustrating an electronic device according to an embodiment.

An embodiment provides an electronic device 1000 as shown in FIG. 9, and the electronic device 1000 may include a processor 1001 and a memory 1003. Here, the processor 1001 is connected to the memory 1003 through, for example, a bus 1002. Optionally, the electronic device 1000 may further include a transceiver 1004. In actual applications, the number of transceivers 1004 is not limited to one, and the structure of the electronic device 1000 is not limited to the embodiment.

The processor 1001 may include a central processing unit (CPU), a general purpose processor, a digital signal processor (DSP), an application specific integrated circuit (ASIC), a field programmable gate array (FPGA), any other editable logic device, a transistor logic device, a hardware component, or any combination thereof. The processor 1001 may form various logical frames, modules, and circuits described in the embodiments. The processor 1001 may include a combination having arithmetic functions, such as a combination of one or more microprocessors or a combination of a DSP and a microprocessor.

The bus 1002 may include paths through which information is transmitted between the aforementioned components. The bus 1002 may include a peripheral component interconnect (PCI) bus, an extended industry standard architecture (EISA) bus, or the like. The bus 1002 may be classified as an address bus, a data bus, a control bus, or the like. For ease of illustration, only one thick line is shown in FIG. 9, but this does not mean that there is only one bus or only one type of bus.

Examples of the memory 1003 may include: a read only memory (ROM) or any other static memory device capable of storing static information and instructions; a random access memory (RAM) or any other dynamic memory device capable of storing information and instructions; an electrically erasable programmable read only memory (EE-PROM); a compact disc read only memory (CD-ROM) or any other optical disc memory or compact disc memory (a compact disc, a laser disc, an optical disc, a digital universal disc, a Blu-ray disc, or the like); a magnetic disk storage media or any other magnetic storage device; and any other medium which is accessible by a computer and usable to carry or store desired program code in the form of instructions or data structures. However, the memory 1003 is not limited thereto.

The memory 1003 stores application program code according to implementation methods of the present disclosure, and is controlled by the processor 1001. The processor 1001 is configured to execute the application program code stored in the memory 1003 to implement the operations of the method described in the previous embodiments.

Here, examples of the electronic device 1000 may include: mobile terminals, such as a mobile phone, a notebook computer, a digital broadcast receiver, a personal digital assistant (PDA), a tablet computer (PAD), a portable multimedia player (PMP), and a vehicle-mounted terminal (for example, a vehicle-mounted navigation terminal); fixed terminals, such as a digital TV, and a desktop computer; and intelligent robots. However, the electronic device 1000 is not limited thereto. The electronic device 1000 illustrated in FIG. 9 is only an example, and the function and scope of the present disclosure are not limited thereto.

An embodiment provides a computer-readable storage medium. A computer program may be stored in the computer-readable storage medium, and when the computer program is executed on a computer, the computer may perform an operation of the method described in the previous embodiments.

In the flowcharts shown in the accompanying drawings, operations are shown in the order indicated with arrows. However, this does not mean that the operations are sequentially performed in the order indicated with the arrows. Unless explicitly described in the present disclosure, the execution of the operations is not strictly limited in terms of order and may be performed in other orders. In addition, at least some of the operations shown in the flowcharts of the accompanying drawings may include several sub-operations or several procedures. These operations or procedures may not be completed simultaneously and may be performed at different times. In addition, the operations or procedures may not be sequentially performed but may be performed together or alternately with at least some of the other operations, sub-operations, or procedures.

The aforementioned computer-readable storage medium of the present disclosure may include a computer-readable signal medium or a computer-readable medium, or any combination thereof.

For example, the computer-readable storage medium may include, but is not limited to, electrical, magnetic, optical, electromagnetic, infrared, or semiconductor systems, devices, elements, or any combination thereof. Examples of the computer-readable storage medium may include, but are not limited thereto, electrical connections having one or more wires, portable computer disks, hard disks, RAMs, ROMs, erasable ROMs (EPROMs) or flash memories, optical fiber, read-only compact disk storages (CD-ROMs), optical memory elements, magnetic memory elements, and any combinations thereof.

In the present disclosure, the computer-readable storage medium may be a medium containing or storing a program, and the program may be used by or with an instruction execution system, device, or element.

In the present disclosure, the computer-readable signal medium may include a data signal propagating in a baseband or as part of a carrier wave on which computer-readable program code is imposed. The propagating data signal may have various forms such as an electromagnetic signal, an optical signal, or a combination thereof. However, the propagating data signal is not limited thereto. The computer-readable signal medium may be any computer-readable medium other than the computer-readable medium and may transmit, distribute, or carry a program used by or with an instruction execution system, apparatus, or element. The program code included in the computer readable medium may be transmitted using any suitable medium, and examples of the suitable medium may include, but are not limited to, wires, optical cables, radio frequencies (RF), and any combination thereof.

The computer-readable medium may be included in the electronic device, and may be provided separately from the electronic device.

One or more programs may be loaded on the computer readable medium, and when the one or more programs are executed on the electronic device, the electronic device performs the method described in the embodiment described above.

One or more programming languages or combinations thereof may be used to write computer program code for carrying out the operations of the embodiments, and examples of the one or more programming languages may include object-oriented programming languages such as Java, Smalltalk, and C++, and conventional procedural programming languages such as C language or programming languages similar to C languages. The program code may be entirely or partially executed on a user's computer or may be executed as a separate packet. In addition, a portion of the program code may be executed on a user's computer, and the other portion of the program code may be executed on a remote computer. In addition, the program code may be executed entirely on a server. The remote computer may be connected to the user's computer via any kind of local area network (LAN) or wide area network (WAN), or may be connected to external computers (for example, to the Internet via an Internet service provider).

The flowcharts and block diagrams shown in the accompanying drawings illustrate implementable structures, functions, and operations of systems, methods, and computer programming products according to various embodiments. In this regard, each block in the flowcharts or block diagrams may represent a single module, a program section, or a code section, and the module, the program section, or the code section may include one or more executable instructions prepared to implement defined logical functions. Furthermore, in some other embodiments, the functions shown in the blocks may be executed in an order different from the order shown in the accompanying drawings. For example, two blocks illustrated as being connected to each other may be executed at the same time or in the reverse order according to the functions thereof. Furthermore, in the block diagrams and/or the flowcharts, all the blocks and combinations of the blocks may be implemented by dedicated hardware-based systems configured to execute specified functions or operations, or by a combination of dedicated hardware and computer instructions.

The modules mentioned in the embodiments may be implemented as software or hardware. In this case, the modules are not limited by the names thereof. For example, the second acquisition module may be referred to as a spatial feature acquisition module.

Only some embodiments and technical principles of the present disclosure have been described. The scope of the present disclosure is not limited to the technical solutions proposed above by combining some of the technical features of the present disclosure. The scope of the present disclosure includes other technical solutions, that is, any combinations of the technical features or equivalents thereof. For example, the scope of the present disclosure may include, but is not limited thereto, technical solutions provided by combining technical features similar to the above-described technical features.

The present disclosure provides the following technical effects.

The present disclosure provides methods executed by electronic devices, electronic devices, and computer-readable storage media. According to the present disclosure, the relative pose between a query image and a search image is estimated based on the spatial features of the query image and the spatial features of the search image, and the spatial features have a wider detection field of view and more spatial information for more precise optimization of a global map than in the prior art.

Furthermore, according to the present disclosure, 3D point sets are estimated by densely and uniformly extracting keypoints and ORB descriptors from images, and then completing stereo matching and triangulation using an epipolar constraint. Therefore, the estimated 3D point sets are more uniformly and densely distributed in space than in a global map. Thus, the global map may be optimized by more accurately determining the relative pose between the images.

In addition, according to the present disclosure, the global map may be effectively optimized through IBA and FBA in a fast and accurate manner.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A simultaneous localization and mapping (SLAM) method performed by an electronic device, the method comprising:

acquiring a search image based on a query image;

acquiring first spatial features of the query image and second spatial features of the search image;

acquiring feature matching results by matching at least one of the first spatial features with at least one of the second spatial features; and estimating a relative pose between the query image and the search image based on the feature matching results, wherein the acquiring feature matching results comprises:

generating one or more first feature matching pairs by performing a coarse matching operation based on the first spatial features and the second spatial features, and generating one or more second feature matching pairs by performing a fine matching operation based on the first spatial features and the second spatial features.

2. The SLAM method of claim 1, wherein the first spatial features and the second spatial features each comprise three dimensional (3D) point sets, and wherein the acquiring the first spatial features and the second spatial features each comprises:

extracting image feature points that comprise image keypoints and feature descriptors; and estimating the 3D point sets by performing stereo matching on the image feature points.

3. The SLAM method of claim 1, wherein the acquiring the feature matching results comprises generating the one or more first feature matching pairs between results of clustering of the query image and results of clustering of the search image by clustering the 3D point sets of the query image and the 3D point sets of the search image.

4. The SLAM method of claim 3, wherein the generating of the one or more first feature matching pairs comprises:

determining one or more first cubes by clustering the 3D point sets of the query image;

determining one or more second cubes by clustering the 3D point sets of the search image;

determining first cluster centroids of the respective first cubes and second cluster centroids of the respective second cubes;

determining the second cluster centroids that respectively match the first cluster centroids; and determining the one or more first feature matching pairs based on the first cluster centroids and the second cluster centroids determined to match each other.

5. The SLAM method of claim 3, wherein the acquiring the feature matching results further comprises acquiring the one or more second feature matching pairs between the 3D point sets of the query image and the 3D point sets of the search image by performing nearest neighbor search and mutual verification on 3D points of the one or more first feature matching pairs, and wherein the determining the relative pose comprises determining the relative pose based on the one or more second feature matching pairs.

6. The SLAM method of claim 5, wherein the feature matching results further comprises third feature matching pairs, wherein the relative pose comprises a coarse relative pose and a fine matching pose, wherein the acquiring the feature matching results further comprises:

estimating the coarse relative pose between the query image and the search image based on the one or more second feature matching pairs; and determining the third feature matching pairs between the 3D point sets of the query image and the 3D point sets of the search image by projecting the 3D point sets of the search image onto a coordinate system of the query image according to the coarse relative pose, and wherein the determining of the fine relative pose comprises determining the relative pose based on the third feature matching pairs.

7. The SLAM method of claim 1, wherein the determining of the relative pose comprises:

estimating a prior relative pose between the query image and the search image based on the feature matching results;

determining local points of the search image corresponding to keypoints of the query image based on the prior relative pose, and generating point matching pairs based on the local points corresponding to the keypoints; and estimating the relative pose based on the point matching pairs.

8. The SLAM method of claim 1, further comprising acquiring an optimized global map by optimizing a current global map based on the relative pose.

9. The SLAM method of claim 8, wherein the acquiring the optimized global map comprises:

determining pose drift information based on the relative pose; and acquiring the optimized global map by determining an optimization strategy based on the pose drift information and optimizing the current global map according to the optimization strategy.

10. The SLAM method of claim 9, wherein the acquiring the optimized global map further comprises:

acquiring the optimized global map by adjusting a prior global map through incremental bundle adjustment when the pose drift information satisfies a preset error condition; or acquiring the optimized global map by adjusting the prior global map through full bundle adjustment when the pose drift information does not satisfy the error condition.

11. The SLAM method of claim 10, wherein the acquiring the optimized global map further comprises:

acquiring a first global map by optimizing a multi-degree-of-freedom pose of a keyframe of the prior global map based on the relative pose; and acquiring the optimized global map by optimizing a keyframe pose and map points of the first global map through whole bundle adjustment.

12. The SLAM method of claim 1, wherein the generating of the one or more first feature matching pairs comprises:

determining one or more first cubes by clustering three dimensional (3D) point sets of the query image;

determining one or more second cubes by clustering the 3D point sets of the search image; and determining the one or more first feature matching pairs based on a comparison between the one or more first cubes and the one or more second cubes.

13. The SLAM method of claim 1, wherein the generating of the one or more first feature matching pairs comprises:

determining one or more first cubes by clustering three dimensional (3D) point sets of the query image;

determining one or more second cubes by clustering the 3D point sets of the search image;

determining first cluster centroids of the respective one or more first cubes and second cluster centroids of the respective one or more second cubes; and determining the one or more first feature matching pairs based on a comparison between the first cluster centroids and the second cluster centroids.

14. An electronic device comprising:

at least one processor;

a memory; and at least one application program stored in the memory and configured to be executed by the at least one processor, the at least one application program being configured to perform simultaneous localization and mapping (SLAM) by:

acquiring a search image based on a query image, acquiring first spatial features of the query image and second spatial features of the search image, acquiring feature matching results by matching at least one of the first spatial features with at least one of the second spatial features, and estimating a relative pose between the query image and the search image based on the feature matching results, wherein the acquiring feature matching results comprises:

generating one or more first feature matching pairs by performing a coarse matching operation based on the first spatial features and the second spatial features, and generating one or more second feature matching pairs by performing a fine matching operation based on the first spatial features and the second spatial features.

15. The electronic device of claim 14, wherein the at least one application program is further configured to generate the one or more first feature matching pairs by:

determining one or more first cubes by clustering three dimensional (3D) point sets of the query image;

determining one or more second cubes by clustering the 3D point sets of the search image; and determining the one or more first feature matching pairs based on a comparison between the one or more first cubes and the one or more second cubes.

16. The electronic device of claim 14, wherein the at least one application program is further configured to generate the one or more first feature matching pairs by:

determining one or more first cubes by clustering three dimensional (3D) point sets of the query image;

determining one or more second cubes by clustering the 3D point sets of the search image;

determining first cluster centroids of the respective one or more first cubes and second cluster centroids of the respective one or more second cubes; and determining the one or more first feature matching pairs based on a comparison between the first cluster centroids and the second cluster centroids.

17. A non-transitory computer-readable storage medium having recorded thereon a program for executing simultaneous localization and mapping method comprising:

acquiring a search image based on a query image, acquiring first spatial features of the query image and second spatial features of the search image, acquiring feature matching results by matching at least one of the first spatial features with at least one of the second spatial features, and estimating a relative pose between the query image and the search image based on the feature matching results, wherein the acquiring feature matching results comprises:

generating one or more first feature matching pairs by performing a coarse matching operation based on the first spatial features and the second spatial features, and generating one or more second feature matching pairs by performing a fine matching operation based on the first spatial features and the second spatial features.

18. The non-transitory computer-readable storage medium of claim 17, wherein the generating of the one or more first feature matching pairs comprises:

determining one or more first cubes by clustering three dimensional (3D) point sets of the query image;

determining one or more second cubes by clustering the 3D point sets of the search image; and determining the one or more first feature matching pairs based on a comparison between the one or more first cubes and the one or more second cubes.

19. The non-transitory computer-readable storage medium of claim 17, wherein the generating of the one or more first feature matching pairs comprises:

determining one or more first cubes by clustering three dimensional (3D) point sets of the query image;

determining one or more second cubes by clustering the 3D point sets of the search image;

determining first cluster centroids of the respective one or more first cubes and second cluster centroids of the respective one or more second cubes; and determining the one or more first feature matching pairs based on a comparison between the first cluster centroids and the second cluster centroids.

* * * * *